Patented Oct. 28, 1941

2,260,409

UNITED STATES PATENT OFFICE 2,260,409

PREPARATION OF MALEIC ACID

Ober C. Slotterbeck, Elizabeth, N. J., and Samuel W. Tribit, New York, N. Y., assignors to Standard Oil Development Company, a corporation of Delaware No Drawing. Application October 4, 1938, Serial No. 233,160

10 Claims. (Cl. 260—533)

This invention relates to an improved method for the production of maleic acid by vapor phase oxidation of unsaturated organic compounds of at least four carbon atoms per molecule, particularly butylenes and butadiene, and substances from which such olefines and diolefines are readily generated.

Maleic anhydride is prepared by the vapor phase oxidation of butenes and related compounds at temperatures of about 250° C. to about 400° C. using air in excess of that required for complete combustion to carbon dioxide and water vapor, over suitable catalysts such as the oxides and salts of vanadium, bismuth, molybdenum, uranium, tungsten, chromium, and manganese. It has now been found that greatly improved yields of maleic anhydride, or maleic acid, are obtained by conducting the oxidation in the presence of substantial amounts of water vapor, which may be used in partial substitution for the nitrogen or other diluents in the air or other oxygen-containing gases used. Improved catalysts for these reactions have also been developed.

The following examples are presented to illustrate suitable methods for carrying out the improved oxidation process of this invention:

Example I 2.3 litres of pure butadiene and 200 litres of air were passed in one hour at a space velocity of 1010 volumes of gas (standard conditions) per volume of catalyst per hour over a catalyst consisting of a mixture of tin vanadate, molybdenum oxide, and titanium oxide, at an average temperature of 376° C. and at substantially atmospheric pressure. The gases issuing from the catalyst chamber were cooled and the maleic acid separated therefrom. The yield of maleic acid was 31% of the theoretical, based on the butadiene used.

Example II

In a similar test in the same apparatus and over the same catalyst, 2.0 litres of pure butadiene, 180 litres of air and 20 litres of water vapor were mixed and passed through the reaction chamber at a space velocity of 1010 at an average temperature of 350° C. Maleic acid was recovered from the oxidation products as before and was obtained in a yield of 40.6% of the theoretical.

Similar increases in yield of maleic acid were obtained when using a mixture of air and steam instead of air alone, in the oxidation of pure butene-2.

In order to determine if the steam exerted merely a diluent effect, similar runs were conducted, substituting nitrogen for a part of the air. In all such cases, the yield of maleic acid was decreased below that obtained when using air alone.

The conditions of the process may be varied considerably from those described in the above examples. Gas mixtures containing butenes, butadiene and/or the butyl alcohols may be used in place of the pure compounds. For example, the so-called "butane cut" obtained in fractionating gaseous products from the cracking of petroleum oils and containing mainly saturated and unsaturated hydrocarbons of four carbon atoms, may be used in place of the pure butadiene in the above example. A typical butane cut fractionated from cracked petroleum gases has approximately the following analysis:

| | Per cent |
|---|---|
| n-Butane | 45 |
| iso-Butane | 15 |
| n-Butylenes | 28 |
| iso-Butylene | 12 |

Other oxidizable organic compounds, such as alcohols, aldehydes, and particularly the unsaturated hydrocarbons, may also be used, those having about 4 to 8 carbon atoms being preferred. These include pentene-2 and other pentenes, the hexenes, cyclohexene, benzene, and other aromatic hydrocarbons and mixtures containing such compounds. For example, a "debutanizer bottoms" fraction of cracked petroleum naphtha, boiling between 120 and 380° F., consisting principally of hydrocarbons of 7 to 11 carbon atoms and containing 20% olefins, was oxidized to maleic acid by the above-described process. An unstabilized gasoline fraction boiling up to 400° F. and containing 40% olefins, prepared by cracking a petroleum gas oil in vapor phase at atmospheric pressure, over an aluminum silicate catalyst, was also oxidized to maleic acid by the same process, the yields of maleic acid in both these cases being 15 to 20%.

The oxidizing gases used preferably contain at least sufficient free oxygen for the complete combustion of the hydrocarbons and amounts greatly in excess of these may be used. The proportion of water vapor in the inlet gases is preferably about 10 to 20% of the air or other oxidizing gases used and somewhat larger amounts, for example between about 5 and 35% can be used, although decreasing or increasing the proportion of water vapor beyond the preferred range may reduce the yield of maleic acid below the maximum obtainable.

The reaction time may also be varied over a rather wide range, longer times being used at the lower range of reaction temperatures.

The oxidation products, particularly when prepared from pure olefines, such as butene-2, pentene-2, or butadiene, contain maleic acid which can be readily separated in a high degree of purity. Such oxidation products are cooled in a condenser to about room or somewhat lower temperatures, and the uncondensed gases are then scrubbed with water. The condensate contains maleic acid, which may be in admixture with maleic anhydride, depending upon the amount of water vapor used. It can be converted directly into pure maleic anhydride by heating under vacuum to a temperature of about 155 to 170° C. The maleic acid recovered in the water scrubber may be similarly recovered by evaporation to dryness, the last stages of the evaporation being preferably conducted under vacuum.

Other improved catalysts which may also be used in the above-described oxidations with or without the addition of water vapor, are the complex mixed salts of molybdic acid which contain two or more basic oxides which are preferably of different groups of the periodic system. Examples of such catalysts and suitable methods for their preparation are described below.

*Example III*

An aqueous solution containing 20 gms. of ammonium molybdate is heated to 60° C. and 10 gms. of boric acid and sufficient ammonium hydroxide to keep the solution basic are added, with stirring, thus obtaining a clear solution. A solution of stannic chloride is then added and a white solid precipitates from the solution. The precipitate is washed carefully with water until the wash water is free of chloride ion. There is thus obtained a complex tin boro-molybdate catalyst.

*Example IV*

The addition of a solution of ferric chloride, in place of the stannic chloride used in Example III, produces a yellow solid precipitate which is similarly recovered. This is a complex ferric boro-molybdate catalyst.

*Example V*

Ammonium hydroxide is added to a solution of 20 gms. of ammonium molybdate and 15 gms. of aluminum chloride hexahydrate until the solution is slightly basic. This solution is heated to 60° C. and there is added to it a solution of manganese chloride, whereupon a light yellow colored precipitate forms. This mixture is heated for one-half hour at the same temperature and is then filtered and the precipitate washed free of chloride. There is thus obtained a complex manganese alumino molybdate catalyst.

*Example VI*

An aqueous solution containing 20 gms. of ammonium molybdate is heated to about 60° C. and 5 gms. of ammonium meta vanadate is then added. The solution quickly becomes yellow and then orange and finally a deep orange-red on further heating at the same temperature. On the addition of a solution of ferric chloride, a brown precipitate is formed, which is separated by filtration and washed free of chloride, there being thus obtained a ferric vanado molybdate catalyst.

*Example VII*

The addition of a solution of uranyl acetate in place of the ferric chloride solution in the preceding example, produces an orange-yellow precipitate, which is filtered and washed free of acetate, there being thus obtained a uranyl vanado molybdate catalyst.

*Example VIII*

An aqueous solution containing 20 gms. of ammonium molybdate is saturated with hydrogen sulfide by bubbling hydrogen sulfide through the solution at ordinary temperature and pressure. The excess hydrogen sulfide is then expelled by heating the solution at 70° C. for about one hour. A solution of chromium chloride is then added and dark green-red crystals are obtained as a precipitate. These are filtered and washed free of chloride. There is thus obtained a chromium sulfo molybdate catalyst.

The above catalysts and others of similar types may be used directly in the oxidation process described above or they may be prepared in tablet form by compression of powders of these catalysts, with or without admixture with fillers or carriers, promoting agents, or tablet making lubricants, in a tablet making machine under high pressures. These catalytic materials may also be distributed on suitable carriers, such as alumina or pumice, if desired, with the addition of binding agents, such as oxalic acid.

This application is not to be limited by any specific examples, all of which are presented herein for purpose of illustration, but is limited only by the following claims in which it is desired to claim all novelty insofar as the prior art permits.

We claim:

1. The process for preparing maleic acid which comprises bringing free oxygen containing gas in excess of that necessary for complete combustion into contact with an oxidizable unsaturated hydrocarbon compound having at least 4 carbon atoms in the molecule, and water vapor normally in excess of that derived from the complete combustion of the said oxidizable unsaturated hydrocarbon over an oxidation catalyst of the class consisting of the oxides and salts of vanadium, bismuth, uranium, tungsten, chromium, manganese, molybdenum, and mixtures thereof, at a temperature of about 250° C. to about 400° C. and recovering the maleic acid from the reaction products.

2. In the process for preparing maleic acid by catalytic oxidation in vapor phase of unsaturated hydrocarbons capable of oxidation to maleic acid with an excess of oxygen-containing gases above that required for complete combustion, a method for obtaining increased yields of maleic acid comprising conducting the said oxidation in the presence of water vapor in excess of that derived by reaction.

3. Process according to claim 2 in which the said oxidizable unsaturated hydrocarbon contains 4 and 8 carbon atoms per molecule.

4. Process according to claim 2 in which the said oxidizable unsaturated hydrocarbon is an olefin between 4 and 8 carbon atoms per molecule.

5. Process according to claim 2 in which the said oxidizable unsaturated hydrocarbon is a butylene.

6. Process according to claim 2 in which the said oxidizable unsaturated hydrocarbon is butene-2.

7. Process according to claim 2 in which the said oxidizable unsaturated hydrocarbon is butadiene.

8. The process for preparing maleic acid which comprises passing a mixture of air in excess of that necessary for complete combustion, water vapor in an amount between about 5% and 35% of the air and an unsaturated hydrocarbon containing 4 carbon atoms per molecule, over an oxidation catalyst at a suitable temperature for the oxidation of butene to maleic acid, and recovering the maleic acid from the reaction product.

9. Process according to claim 8 in which the water vapor is present in an amount between about 10% and about 20% of the volume of the said oxygen-containing gas.

10. Process according to claim 8 in which the oxygen-containing gas is air.

OBER C. SLOTTERBECK.
SAMUEL W. TRIBIT.